United States Patent [19]

Krecke

[11] Patent Number: 4,536,430
[45] Date of Patent: Aug. 20, 1985

[54] PROCESS FOR THE PRODUCTION OF LEATHER BASE MATERIAL

[76] Inventor: Edmond D. Krecke, 72 Boulevard de la Pétrusse, LU-Luxemburg Stadt, Luxembourg

[21] Appl. No.: 382,085

[22] Filed: May 26, 1982

[51] Int. Cl.³ .......................... C08J 9/00; C08L 89/06
[52] U.S. Cl. ..................................... 428/151; 106/124; 106/155; 106/161; 521/84.1; 521/102
[58] Field of Search ....................... 521/84, 102, 84.1; 106/155, 124, 161, 158; 428/151

[56] References Cited

U.S. PATENT DOCUMENTS

| | | | |
|---|---|---|---|
| 736,957 | 8/1903 | Gautier | 106/155 |
| 2,096,684 | 10/1937 | Neufeld | 106/158 |
| 2,299,011 | 10/1942 | Emmitt | 106/155 |
| 2,808,398 | 10/1957 | Forward | 106/155 |
| 4,246,360 | 1/1981 | Brown et al. | 521/102 |
| 4,327,195 | 4/1982 | Cioca et al. | 521/102 |
| 4,380,474 | 4/1983 | Cioca et al. | 106/155 |

*Primary Examiner*—Theodore Morris
*Attorney, Agent, or Firm*—Gifford, VanOphem, Sheridan, Sprinkle & Nabozny

[57] ABSTRACT

Leather waste is cut up into strips or portions and then subjected to working in order to break up the strips or portions into fine material and individual fibers, the fibers then being separated from the fine material. Alternatively, the strips or portions may be worked in order to loosen cohesion between the fibers, thereby producing bunches thereof. The bunches are at least partially broken up into individual fibers by means of a solvent which is then removed. Additives may be added in order to impart further properties to the material.

37 Claims, No Drawings

PROCESS FOR THE PRODUCTION OF LEATHER BASE MATERIAL

Leather has long been used for many purposes and in many areas of human activity, because of the widely varying and excellent properties which it has for many uses, being for example flexible, hard-wearing and at least to a certain degree water-proof. Due to its animal origin however, the amount of leather available for use by necessity tends to be restricted and leather also tends to be comparatively expensive in relation to other materials which might be used to perform the same function, even if not so satisfactorily.

An object of the present invention is to provide a process for the production of a material which has similar properties to leather in at least some respects.

A further object of the present invention is to provide a process for the production of a leather-like material to which further properties can be imparted depending on the desired use of the material.

Still another object of the present invention is to provide a leather base material which is produced from leather waste.

A still further object of the present invention is to provide a process for the production of a leather base material, which maximises the possibility of using leather waste.

Yet a further object of the present invention is to provide a process for producing a leather base material which can be modified to adapt its properties to the subsequent use to be made thereof.

These and other objects are achieved by a process for the production of leather base material wherein leather waste is divided up into strips or portions as by cutting or shearing. The strips or portions are then worked in order to break them up into fine material and individual fibers The operation of working the strips or portions to cause them to disintegrate may be effected by tearing or shredding the strips or portions, or crushing or bruising them. The individual fibers are then separated from the fine material.

It will be noted that the above-identified mode of operation takes as its starting material leather waste which is generally available in large quantities. It should be appreciated that the leather waste used in this process may be for example of such a size that it could not be satisfactorily used in the form in which it occurs, for purposes other than the present invention, and therefore constitutes genuine waste which would otherwise be thrown away. The result of carrying out the steps of the process as outlined above is a fiber material comprising individual fibers which are interlocked or hooked or matted together. By suitably cutting or shearing the leather waste, the length of the fibers should generally be in the range of from about 2 mm to 14 mm.

The operation of tearing or shredding the leather strips or portions can be carried out in a high-speed rotary drum having sets of blades which are arranged in comb-like assemblies, some of the blades being carried by and thus rotating with the drum, while other blades are stationary, as by being mounted to a casing around the drum. The interaction of the blades as the drum rotates not only causes the leather strips or portions to be torn or shredded, but it also causes nicking and indentation in the fibers, and roughening of the surface thereof, thereby contributing to improved interlocking and matting of the fibers. Crushing or bruising of the strips or portions of leather, as an alternative to tearing or shredding them, can be carried out by any suitable apparatus capable of producing the crushing or bruising effect.

In use of the fiber material produced, for example on a construction site, the fiber material can be watered and then sprayed on to a surface intended to receive it, to form a layer thereon. When the fiber material dries, the fibers contract and pull together and also interlock with each other, thereby forming a firm and solid layer on that surface. Desirably however, in order to improve the qualities of the fiber material, an advantageous development of the invention provides that the fiber material is mixed with a plasticising agent and/or a binder and/or a resin before it is applied in the form of a layer to a surface intended to receive it. The plasticising agent used may be for example tylose (methyl cellulose), with or without binder. The binder may be for example a substance such as cellulose gelatin, methyl cellulose or the like. Resin, in particular synthetic resin, is advantageously added in powder form.

In addition to the above-indicated process for the production of leather base material, wherein a fiber material is produced by a dry method, the invention also provides a further process for the production of a leather base material, wherein leather waste is cut or sheared into strips or portions. The strips or portions are then worked as by tearing or shredding, or crushing or bruising, in such a way as to loosen the cohesion between the individual fibers thereby producing bunches or bundles of fibers. The bunches or bundles of fibers are at least partly broken up or disintegrated into individual fibers by means of a solvent which is then removed. It will be seen therefore that in this form of the process in accordance with the principles of the present invention the strips or portions of leather waste material are not torn or shredded completely so as to be separated into individual fibers, but the fibers are only loosened within the structure of the strips or portions, in such a way as to form bunches or bundles. The bunches which are formed in that manner are then subjected to treatment with a suitable solvent, for example acetone with copper oxide ammonia and copper sulphate, resulting in a gelatin-like mass after the solvent has been separated off. In this mode of operation, the treatment with the solvent can be interrupted before all the solid material has been broken up into individual fibers, so that the bunches of fibers remain in the gelatin-like mass and only initial dissolution of the material occurs. Alternatively however, it is possible for the whole of the fiber material to be disintegrated in the above-indicated manner.

The gelatin-like mass can be used, in a proportion of for example around 10%, to serve as a binding agent for the fiber material produced by the first process outlined above in accordance with the invention.

In accordance with a further advantageous aspect of the invention, the base material produced in accordance with both processes according to the principles of the present invention can be mixed with a filler. The filler may be for example pumice, vermiculite, cork or the like material, thereby producing a leather material which has particularly good thermal insulation qualities. The addition of a foaming agent and/or a blowing agent of the usual kind employed in such circumstances permits the heat insulation capability of the material to be further increased, while being of low weight. If on the other hand the requirement is for good thermal conductivity, for example in use in connection with floor heating systems, the filler used may be for example metal dust and/or metal chips or turnings, comprising a material for example such as aluminium which provides good resistance to oxidation. In this way, a floor heating system can be applied directly to a concrete floor base, a first layer comprising a leather base material with a pumic filler to provide good thermal insulation, with the heating pipes or tubes then being laid on the first layer and subsequently covered by a metal-filled cover layer to form the resistant floor layer on which people will walk.

Additional additive materials may be employed in order to provide given desired properties, in particular thixotropic agents or flame-proofing agents. In addition, the base material may be colored as desired, more particularly by adding coloring agents or dyes or by using leather waste which is already of the desired color. Hardening of the material can be accelerated by adding white lime in powder form, thereby also achieving an improved degree of surface hardness.

The leather base material in accordance with the present invention can be used for coating a widely varying range of surfaces. Depending on the nature of the surface, the mixtures used and the other relevant operating circumstances, the material may be applied to the surface by spraying, spreading, pouring or by means of a spatula. Coating layers can be applied directly to a wide variety of surfaces such as walls, floors or ceilings, or alternatively it is possible to use a carrier material, for example in the form of a woven fabric, a metal or plastic film or foil, a paper web or a mesh or net structure. After the leather base material is applied, the result is a material in web form which may be used in many different ways, for example for enhancing a surface or to provide a thermal barrier. The surface of the material itself may also be subjected to suitable treatment as required, for example by forming a grain or pocking, or embossing thereon, thereby imparting to the material the appearance of genuine leather. The one or more layers which are produced in accordance with the invention not only provide for insulation or conduction of heat, as referred to above, but at the same time also provide an outer decorative layer so that there is no need for any additional cover layers for decorative purposes. As the basic components of the materials used are of biological nature, there is no fear of toxic vapours being produced in the event of the material catching fire, as happens when plastic materials catch fire.

Various other modifications and variations may be made in the process and material of the present invention without thereby departing from the spirit and scope of the invention.

What is claimed is:

1. A process for the production of leather base material comprising:
   (a) dividing leather waste into pieces;
   (b) subjecting the pieces to mechanical working to cause the pieces to break up into fine material and individual fibers, said fibers being generally in the range from 2 to 14 mm in length;
   (c) separating the fibers from the fine material; and
   (d) incorporating said fibers into a leather base material.

2. A process as set forth in claim 1 wherein said waste is divided up into pieces by shearing.

3. A process as set forth in claim 1 wherein said pieces are subjected to mechanical working by shredding.

4. A process as set forth in claim 1 wherein said pieces are subjected to mechanical working by crushing.

5. A process as set forth in claim 1 wherein the fibers are mixed with at least one of a plasticising agent, a binder or a resin.

6. A process as set forth in claim 5 wherein the binder is a substance selected from a group including cellulose gelatin and methyl cellulose.

7. A process as set forth in claim 1 wherein said waste is cut into strips.

8. A process as set forth in claim 1 wherein a filler is added to the material.

9. A process as set forth in claim 8 wherein the filler is at least one of metal dust or metal chips.

10. A process as set forth in claim 1 wherein at least one of a foaming agent or a blowing agent is added.

11. A process as set forth in claim 1 wherein a thixotropic agent is added.

12. A process as set forth in claim 1 wherein a flame proofing agent is added to the material.

13. A process as set forth in claim 1 wherein a coloring agent is added to the material.

14. A process as set forth in claim 1 wherein white lime in powder form is added.

15. A process for the production of leather base material comprising:
   (a) dividing leather waste into pieces;
   (b) subjecting the pieces to mechanical working, thereby to loosen cohesion between the fibers and produce bunches of fibers, said fibers being generally in the range from 2 to 14 mm in length;
   (c) at least partially breaking up the bunches into individual fibers by means of a solvent;
   (d) removing the solvent; and
   (e) incorporating said fibers into a leather base material.

16. A process as set forth in claim 15 wherein said waste is divided up into pieces by shearing.

17. A process as set forth in claim 15 wherein said pieces are subjected to mechanical working by shredding.

18. A process as set forth in claim 15 wherein said pieces are subjected to mechanical working by crushing.

19. A process as set forth in claim 5 wherein the leather base material produced by the process set forth in claim 15 is used as the binder set forth in claim 5.

20. A process as set forth in claim 15 wherein a filler is added to the material.

21. A process as set forth in claim 20 wherein the filler is at least one of metal dust or metal chips.

22. A process as set forth in claim 15 wherein at least one of a foaming agent or a blowing agent is added to the material.

23. A process as set forth in claim 15 wherein a thixotropic agent is added.

24. A process as set forth in claim 15 wherein a flame proofing agent is added to the material.

25. A process as set forth in claim 15 wherein a coloring agent is added.

26. A process as set forth in claim 15 wherein white lime in powder form is aded to the material.

27. A method of coating a surface by applying thereto a leather base material produced by a process as set forth in claim 1.

28. A method of coating a surface by applying thereto a leather base material produced by a process as set forth in claim 15.

29. A laminate material including a leather base material produced by a process as set forth in claim 1 or claim 15.

30. A material as set forth in claim 29 and including a carrier material for said leather base material.

31. A material as set forth in claim 29 wherein said leather base material is arranged in at least two layers.

32. A material as set forth in claim 29 wherein the surface thereof is provided with a surface configuration.

33. A material as set forth in claim 32 wherein said surface configuration comprises a grain effect.

34. A material as set forth in claim 32 wherein said surface configuration comprises embossing.

35. A recycled leather base material produced by taking leather waste; dividing the waste into pieces of reduced size; subjecting the pieces to a mechanical working action thereby to at least weaken the fiber structure of the pieces, such as to define fibers thereof having lengths generally in the range from 2 to 14 mm; removing said fibers as the product; and incorporating said fibers into a leather base material.

36. A material as set forth in claim 35 wherein said pieces are broken up by said mechanical working action into individual fibers and fine material and said fibers and fine material are separated to give the fibers as the product.

37. A material as set forth in claim 35 wherein the fiber structure of said pieces is weakened by said mechanical working action loosening the cohesion between fibers, thereby producing fiber bunches, said bunches are broken up into individual fibers by solvent means, and the solvent means is removed from the fibers.

* * * * *

UNITED STATES PATENT AND TRADEMARK OFFICE
CERTIFICATE OF CORRECTION

PATENT NO. : 4,536,430

DATED : August 20, 1985

INVENTOR(S) : Edmond D. Krecke

It is certified that error appears in the above-identified patent and that said Letters Patent is hereby corrected as shown below:

Column 1, line 27 delete "maximises" insert --maximizes--.

Column 1, after line 33 insert "Summary of the Present Invention"

Column 1, line 38 after "fibers" insert --.--.

Column 4, claim 26, line 63 delete "aded" insert --added--.

Signed and Sealed this

Eleventh Day of February 1986

[SEAL]

Attest:

DONALD J. QUIGG

Attesting Officer

Commissioner of Patents and Trademarks